United States Patent
Bourgeois, Jr.

(10) Patent No.: US 6,314,869 B1
(45) Date of Patent: Nov. 13, 2001

(54) OUTDOOR COOKING APPARATUS

(76) Inventor: Norman R. Bourgeois, Jr., 712 St. George Ave., Jefferson, LA (US) 70121

( * ) Notice: Subject to any disclaimer, the term of this patent is extended or adjusted under 35 U.S.C. 154(b) by 0 days.

(21) Appl. No.: 09/838,444

(22) Filed: Apr. 19, 2001

Related U.S. Application Data

(60) Provisional application No. 60/253,485, filed on Nov. 28, 2000, and provisional application No. 60/199,898, filed on Apr. 26, 2000.

(51) Int. Cl.[7] .............................. A23L 1/00; A47J 37/00; A47J 37/04; A47J 37/07; A47J 37/12
(52) U.S. Cl. .............................. 99/340; 99/403; 99/413; 99/419; 99/426; 99/450
(58) Field of Search .................. 99/839, 340, 345–347, 99/403–418, 426, 419–421 V, 444–450, 400, 401, 482; 126/41 R, 25 R, 40, 30, 9 R; 426/523, 509; D7/409

(56) References Cited

U.S. PATENT DOCUMENTS

| | | | | |
|---|---|---|---|---|
| 3,053,169 | * | 9/1962 | Rappaport | 99/421 V |
| 4,420,493 | * | 12/1983 | Greck | 99/419 X |
| 4,450,759 | * | 5/1984 | Steibel | 99/426 X |
| 4,735,135 | * | 4/1988 | Walker | 99/415 X |
| 5,065,735 | | 9/1991 | Bourgeois et al. | |
| 5,106,642 | * | 4/1992 | Ciofalo | 426/509 |
| 5,301,602 | * | 4/1994 | Ryczek | 99/345 |
| 5,442,999 | | 8/1995 | Meister | |
| 5,531,154 | * | 7/1996 | Perez, III | 99/340 |
| 5,758,569 | * | 6/1998 | Barbour | 99/415 |
| 5,813,321 | * | 9/1998 | Bourgeois | 99/340 |
| 5,896,810 | * | 4/1999 | Barbour | 99/415 |
| 5,970,852 | * | 10/1999 | Bourgeois | 99/340 |
| 6,058,830 | * | 5/2000 | Bourgeois | 99/340 |

FOREIGN PATENT DOCUMENTS

| | | |
|---|---|---|
| 217592 | 10/1961 | (AT) . |
| 2685862 | 7/1993 | (FR) . |
| 2205734 | 12/1988 | (GB) . |

OTHER PUBLICATIONS

Pictures of drip rack as described in patent application, page 5, lines 26–31, undated.

* cited by examiner

Primary Examiner—Timothy F. Simone
(74) Attorney, Agent, or Firm—Garvey, Smith, Nehrbass & Doody, LLC

(57) ABSTRACT

A cooking pot apparatus includes a pot and a food holder or perforated liner. The food holder can be a turkey frying device, for example. A drip rack can be used to support the food holder or liner above the pot. During use, the liner can be placed upon the pot upper annular rim. The drip rack then provides a pair of angularly disposed sections that can support the liner. Bends on the rack prevent the rack from sliding laterally off the pot.

31 Claims, 3 Drawing Sheets

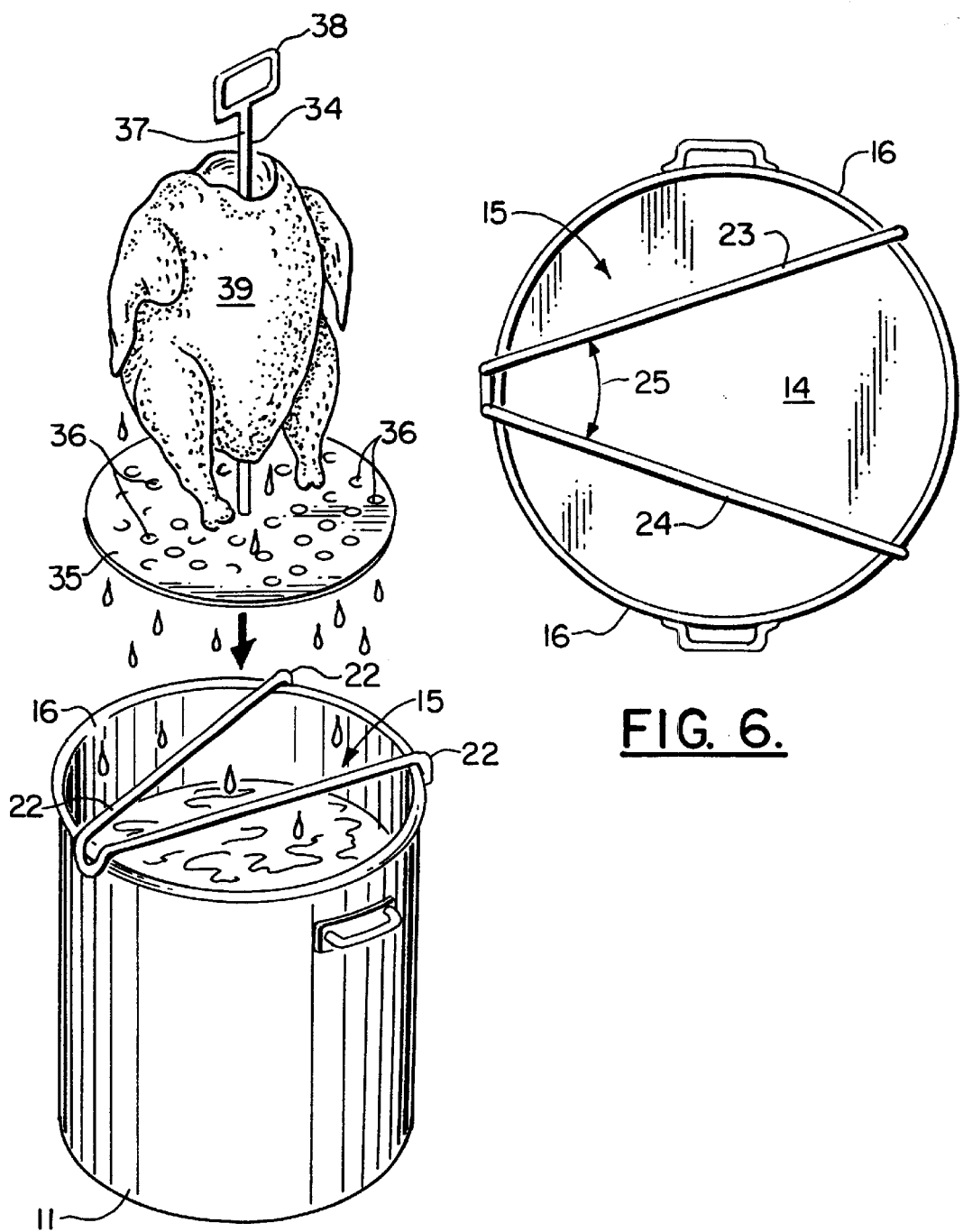

OUTDOOR COOKING APPARATUS

CROSS-REFERENCE TO RELATED APPLICATIONS

Priority of U.S. Provisional Patent Application Ser. No. 60/253,485, filed Nov. 28, 2000, entitled "Outdoor Cooking Apparatus"; and U.S. Provisional Patent Application Ser. No. 60/199,898, filed Apr. 26, 2000, entitled "Cooking Pot Apparatus" incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to an outdoor cooking apparatus in the form of a pot, liner and drip rack. More particularly, the present invention relates to an improved cooking pot apparatus that includes a pot, a liner that fits the pot and a drip rack that can be placed in between the top of the pot and the liner. When the liner is lifted vertically from the pot, it can be placed on the drip rack, and any liquid contained in or on food within the liner drips back into the pot.

2. General Background of the Invention

Outdoor cooking devices that include a gas (eg. butane or a propane) fueled burner and a large cooking pot have been sold for many years that utilize a perforated liner. Such pots have been in use for decades wherein the pot is of a heavy aluminum, stainless steel or cast iron construction with a volume of about 20–100 quarts. The liner is typically in the form of a perforated basket having a bail for lifting and handling the liner. Liners are typically manufactured of stainless steel, aluminum, steel, or the like.

One of the most popular liners is a cylindrically shaped liner that has a perforated bottom and a perforated cylindrical side wall. Small feet on the bottom are provided to space the liner a short distance from the bottom of the pot.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

Examples of these prior art type outdoor cooking devices can be seen in the 1997 and 1998 brochures of Metal Fusion, Inc., of Jefferson, La.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are appertured longitudinally for receiving a knife to cut food within the tube member.

Recently issued patents to Barbour (U.S. Pat. Nos. 5,758, 569 and 5,896,810) disclose a cooking apparatus directed to the frying of poultry items such as turkeys.

A number of patents have issued to Norman R. Bourgeois that disclose burner configurations, including U.S. Pat. Nos. 5,813,321, 5,970,852, 6,058,830.

One of the problems with outdoor cookers is the handling of a batch of food once cooked. Items that are cooked in large pots (e.g. 100 quart) inside liners or strainers are very hot when removed. These food items can be very heavy, weighing as much as fifty pounds in some situations, often comprising a large number of crabs, shrimp, etc., or a large turkey as examples. The cooked food items typically drip heated cooking juices, such as seasoned water, or even hot oil. It is desirable that such an outdoor cooking apparatus have stability to support both the pot during cooking and the pot insert (e.g. basket) after cooking is complete.

BRIEF SUMMARY OF THE INVENTION

The present invention includes a pot that includes a flat bottom portion and cylindrically-shaped continuous side walls, the pot having a generally cylindrically-shaped interior for receiving a basket. The basket or liner removably fits the pot interior. An improved support bracket fits in between the pot and liner after the liner is removed, for supporting the liner above the pot for drainage.

Lined pots are very popular for cooking outdoors with seasoned water or oil. Such a lined pot can be used, for example, to cook many different seafood items such as crabs, lobster, etc. When such a pot is filled with cooking oil, the liner can contain items to be fried such as fish, poultry, etc.

One of the problems associated with cooking items in a pot with a perforated liner relates to cleanup because of liquid dripping from the liner. The cooking fluid immediately drains from food contained within the liner when the liner is lifted vertically from the pot.

A solution to this problem is a drip rack that is placed across the top of the pot and upon which the liner can be rested. In this fashion, the liner is positioned vertically above the pot so that fluids can drain from food items contained within the liner into the pot.

Metal Fusion, Inc. of Jefferson, La. has for years sold a prior art type drip rack in the form of a pair of linear stock members that are pivotally connected at respective end portions. The present invention discloses a cooking apparatus that includes a drip rack that is an improvement over that type of prior art drip rack.

BRIEF SUMMARY OF THE INVENTION

The present invention provides an improved cooking pot apparatus that includes a pot having an interior for accepting a perforated liner. The perforated liner fits the pot interior, the liner having a bottom and side walls and a portion that can be lifted such as a bail, enabling the liner to be placed within the pot interior and to be removed from the pot interior.

The improved drip rack of the present invention can be fitted to the top annular rim of the pot. The drip rack of the present invention is preferably comprised of a length of stock having a plurality of bends, one of the bends orienting the length of the stock in a generally folded shape that defines a plane, and at least some of the bends bending away from the plane to provide a plurality of projecting retainers that project downwardly during use. These projecting retainers prevent a sliding of the drip rack laterally away from the pot. The drip rack is sized and shaped to support the liner when placed thereon.

In the preferred embodiment, the length of stock has two sections that are angled relative to one another.

In the preferred embodiment, the liner provides at least three bends, preferably five bends. At least four of the bends form angles of between about 30 and 120 degrees.

In the preferred embodiment, the length of stock is of a metallic, unitary construction. In the preferred embodiment, the length of stock has a V shape.

In the preferred embodiment, each length of stock includes a pair of sections that are substantially straight and linear along the majority of the length of the section.

In the preferred embodiment, there are two sections that are about equal in length.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 6 is a partial plan view of the preferred embodiment of the apparatus of the present invention illustrating the drip rack and pot geometry during use; and FIG. 7 is a perspective view of the preferred embodiment of the apparatus of the present invention illustrating the pot, drip rack and liner.

DETAILED DESCRIPTION OF THE INVENTION

Figure 5:
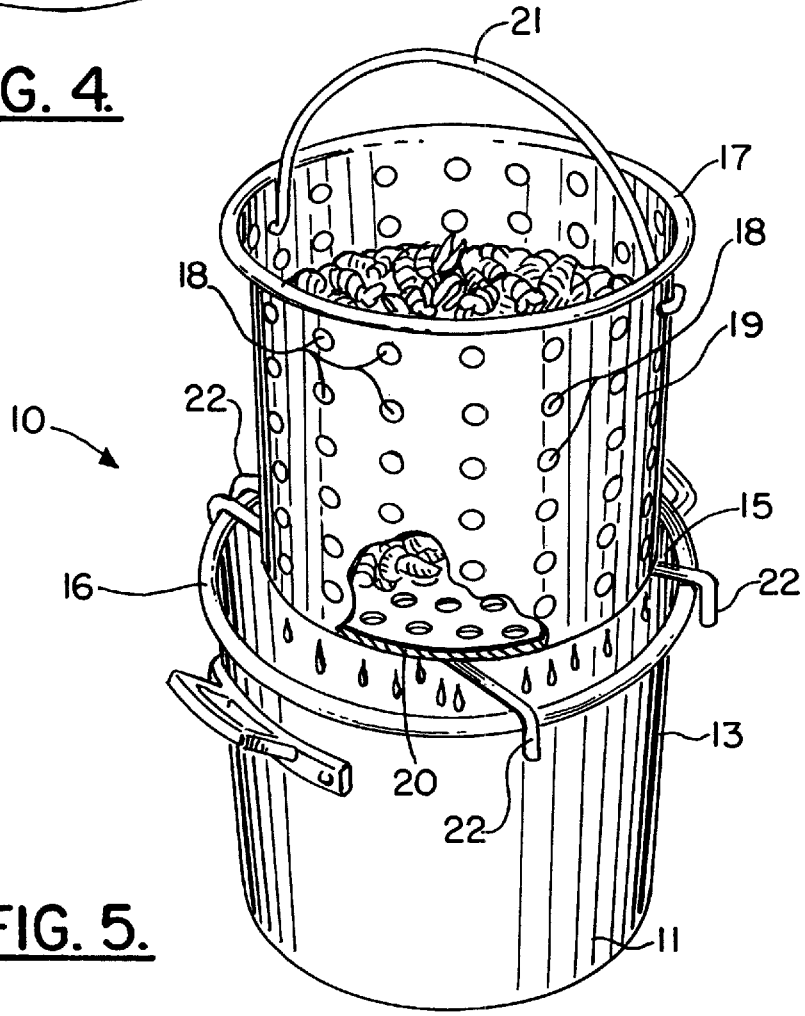
FIG. 5 is a partially cutaway perspective view of the preferred embodiment of the apparatus of the present invention shown during use.

FIGS. 1–5 show generally the preferred embodiment of the apparatus of the present invention designated generally by the numeral 10 in FIG. 5. Cooking pot apparatus 10 includes a pot 11 having a pot interior 12, a cylindrically shaped wall 13, circular bottom 14, and an open top 15. An annular rim 16 is provided at open top 15. During use, drip rack 22 fits upon annular rim 16.

Liner 17 likewise includes a cylindrical wall 19, circular bottom 20 and a plurality of perforations 18 for enabling fluid contained on food items to drain from the liner 17 when it is removed from pot interior 12.

Bail 21 can be provided at the upper end portion of liner 17 to assist a user in manipulating the liner 17 during placement into or removal from pot interior 12. In place of liner 17, a poultry 39 supporting insert 34 can be used (see FIG. 4A) that includes plate 35 with openings 36, rod 37 and eyelet 38. The broad concept of a cooking pot 11 and perforated liner 17 is old and known in the art. Poultry supporting inserts 34 are also known and commercially available.

The present invention provides an improved drip rack 22 that fits in between pot 11 at annular rim 16 and liner 17. In order to drain liquid from food items contained within liner 17 or supported by insert 34, drip rack 22 is first positioned upon annular rim 16 of pot 11 in the position shown in FIGS. 4 and 6. The bottom 20 of liner 17 is then placed upon drip rack 22 and more particularly upon the first and second sections 23, 24. Sections 23, 24 are preferably linear, straight sections.

Drip rack 22 is preferably an integral, single piece of stock (such as a length of metal stock) that is comprised of first section 23, a second section 24 and a plurality of bends that connect the two sections 23, 24 together. Sections 23, 24 form an angle 25 of preferably between about 15 and 75 degrees.

Figure 1:
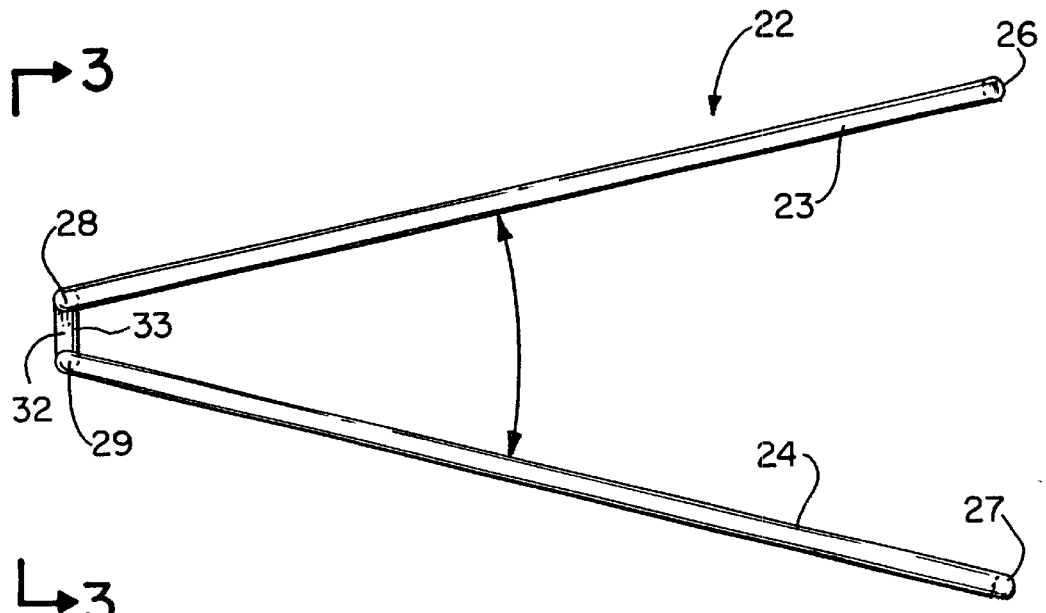
FIG. 1 is a top, plan view of the preferred embodiment of the apparatus of the present invention.
Figure 2:
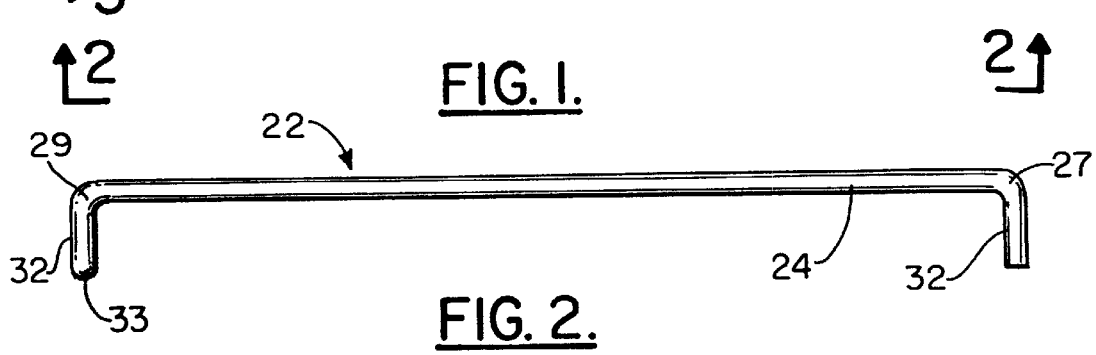
FIG. 2 is a side view of the preferred embodiment of the apparatus of the present invention.
Figure 3:
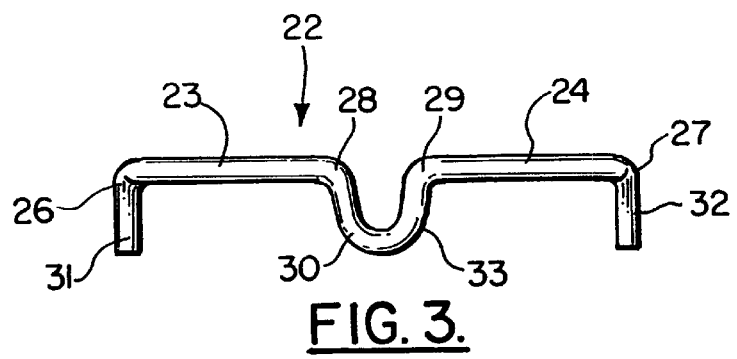
FIG. 3 is an end view of the preferred embodiment of the apparatus of the present invention.
Figure 4:
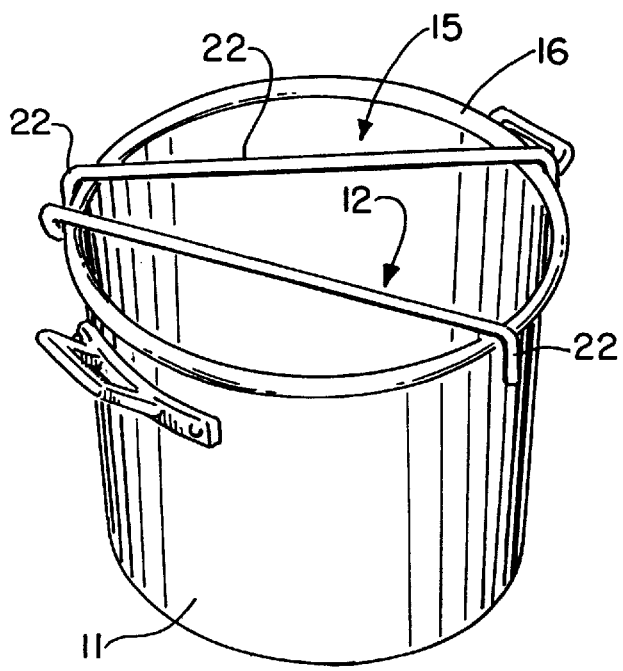
FIG. 4 is a perspective view of the preferred embodiment of the apparatus of the present invention illustrating the geometry of the drip rack and associated pots.

The plurality of bends include three bends 28, 29, 30 that are part of projection 33. Projection 33 and bends 28, 29, 30 also define a joint between the sections 23, 24 as shown in FIGS. 1–3. The projection 33 faces downwardly during use as shown in FIGS. 4–7 helping retain drip rack 22 on annular rim 16 of pot 11.

Each of the sections 23, 24 has a free end that provides a bend and a projection. First section 23 has bend 26 and projection 31. Second section 24 has bend 27 and projection 32. These projections 31, 32 in combination with projection 30 help retain drip rack 22 upon annular rim 16 of pot 11.

In FIG. 6, it can be shown that the projections 31, 32, 33 can be positioned very close to annular rim 16 so that the combination of the close proximity of projections 31, 32, 33 to rim 16 and angle 25 between sections 23, 24 prevents substantial lateral movement of drip rack 22 relative to annular rim 16 of pot 11. As shown in the drawings (see FIG. 5), the drip rack 22 can be configured so that projections 31, 32, 33 are closely positioned next to pot 11 annular rim 16. In this fashion, the projections prevent rack 22 from sliding laterally (horizontally) in any direction relative to pot 11. Projections 31, 32, 33 are thus circumferentially spaced apart an angular measure of between about 100°–150°.

PARTS LIST

The following is a list of suitable parts and materials for the various elements of the preferred embodiment of the present invention.

| Part No. | Description |
| --- | --- |
| 10 | cooking pot apparatus |
| 11 | pot |
| 12 | pot interior |
| 13 | wall |
| 14 | bottom |
| 15 | open top |
| 16 | annular rim |
| 17 | liner |
| 18 | perforation |
| 19 | wall |
| 20 | bottom |
| 21 | bail |
| 22 | drip rack |
| 23 | first section |
| 24 | second section |
| 25 | angle |
| 26 | bend |
| 27 | bend |
| 28 | bend |
| 29 | bend |
| 30 | bend |
| 31 | projection |
| 32 | projection |
| 33 | projection |
| 34 | insert |
| 35 | plate |
| 36 | opening |
| 37 | rod |
| 38 | eyelet |
| 39 | poultry |

The foregoing embodiments are presented by way of example only; the scope of the present invention is to be limited only by the following claims.

What is claimed is:

1. A cooking pot apparatus comprising:
   a) a pot having an interior, a side wall, a bottom, an open top, and an annular upper rim with a diameter;
   b) a perforated liner that fits the pot interior, the liner having a bottom and a side wall and a portion that can be lifted for enabling the liner to be placed into the pot interior and to be removed from the pot interior;
   c) a drip rack that can be fitted to the pot at the annular rim, the drip rack comprised of a one-piece length of stock having a plurality of bends, one of the bends orienting the length of stock in a generally folded shape that defines a plane, and at least some of the bends bending away from the plane to define a plurality of retainers that prevent a sliding of the drip rack laterally away from the pot; and
   d) the drip rack being sized to support the liner when placed thereon.

2. The cooking pot apparatus of claim 1 wherein there are at least three bends.

3. The cooking pot apparatus of claim 1 wherein there are five bends.

4. The cooking pot apparatus of claim 3 wherein at least four of the bends form angles of between about thirty and one hundred twenty degrees.

5. The cooking pot apparatus of claim 1 wherein the length of stock is metallic.

6. The cooking pot apparatus of claim 1 wherein the length of stock has a V-shape.

7. The cooking pot apparatus of claim 1 wherein the length of stock has two sections that are angled relative to one another.

8. The cooking pot apparatus of claim 1 wherein each section is substantially straight and linear along a majority of its length.

9. The cooking pot apparatus of claim 7 wherein the two sections are about equal in length.

10. A cooking pot apparatus comprising:
    a) a pot having an interior, a side wall, a bottom, an open top, and an annular upper rim with a diameter;
    b) a food holder that fits the pot interior, the food holder having a bottom that fits next to the pot bottom and a lifting portion that can be lifted for enabling the food holder to be placed into the pot interior and to be removed from the pot interior;
    c) a drip rack that can be fitted to the pot at the annular rim, the drip rack comprised of a one-piece length of stock having a plurality of bends, one of the bends orienting the length of stock in a generally folded shape that defines a plane, and at least some of the bends bending away from the plane to define a plurality of retainers that prevent a sliding of the drip rack laterally away from the pot; and
    d) the drip rack being sized to support the liner when placed thereon.

11. The cooking pot apparatus of claim 10 wherein there are at least three bends.

12. The cooking pot apparatus of claim 10 wherein there are five bends.

13. The cooking pot apparatus of claim 10 wherein at least four of the bends form angles of between about thirty and one hundred twenty degrees.

14. The cooking pot apparatus of claim 10 wherein the length of stock is metallic.

15. The cooking pot apparatus of claim 10 wherein the length of stock has a V-shape.

16. The cooking pot apparatus of claim 10 wherein the length of stock has two sections that are angled relative to one another.

17. The cooking pot apparatus of claim 10 wherein each length of stock is substantially straight and linear along a majority of its length.

18. The cooking pot apparatus of claim 10 wherein the two sections are about equal in length.

19. The cooking pot apparatus of claim 10 wherein the food holder is a poultry supporting food holder.

20. The cooking pot apparatus of claim 19 wherein the food holder is configured to support on entire turkey carcass.

21. A cooking pot apparatus comprising:
   a) a pot having an interior, a side wall, a bottom, an open top, and an annular upper rim with a diameter;
   b) a food holder that fits the pot interior, the food holder having a container portion for holding food, a bottom that fits next to the pot bottom and a lifting portion that can be lifted for enabling the food holder to be placed into the pot interior and to be removed from the pot interior;
   c) a drip rack that can be fitted to the pot at the annular rim, the drip rack comprised of a one-piece length of stock having a plurality of bends, one of the bends orienting the length of stock in a generally folded shape that defines a plane, and at least some of the bends bending away from the plane to define a plurality of retainers that prevent limit lateral sliding movement of the drip rack relative to the pot; and
   d) the drip rack being sized to support the food holder when placed thereon.

22. The cooking pot apparatus of claim 21 wherein there are at least three bends.

23. The cooking pot apparatus of claim 21 wherein there are five bends.

24. The cooking pot apparatus of claim 21 wherein at least four of the bends form angles of between about thirty and one hundred twenty degrees.

25. The cooking pot apparatus of claim 21 wherein the length of stock is metallic.

26. The cooking pot apparatus of claim 21 wherein the length of stock has a V-shape.

27. The cooking pot apparatus of claim 21 wherein the length of stock has two sections that are angled relative to one another.

28. The cooking pot apparatus of claim 21 wherein each length of stock is substantially straight and linear along a majority of its length.

29. The cooking pot apparatus of claim 21 wherein the two sections are about equal in length.

30. The cooking pot apparatus of claim 21 wherein the food holder is a poultry supporting food holder.

31. The cooking pot apparatus of claim 19 wherein the food holder is configured to support on entire turkey carcass.

* * * * *